Figure 1:
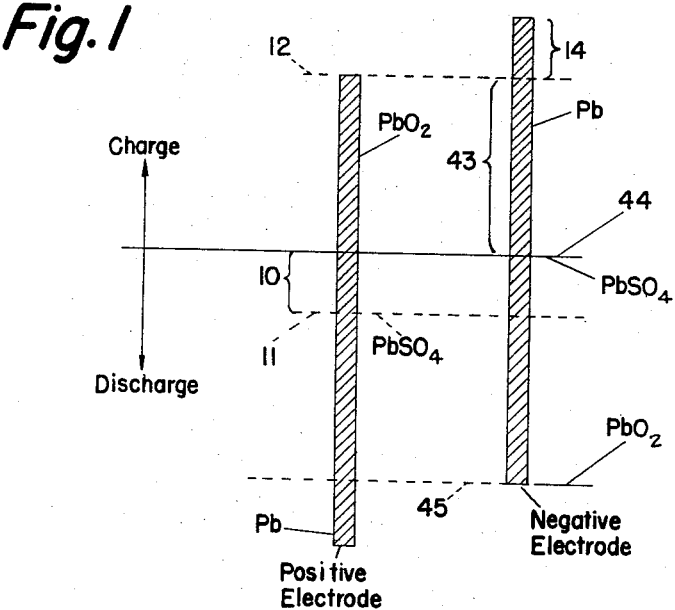

Aug. 30, 1960 P. RUETSCHI 2,951,106
STORAGE BATTERY CONSTRUCTION
Filed Feb. 19, 1957 2 Sheets-Sheet 1

INVENTOR.
PAUL RUETSCHI
BY
ATTORNEY

United States Patent Office 2,951,106
Patented Aug. 30, 1960

2,951,106
STORAGE BATTERY CONSTRUCTION

Paul Ruetschi, Glenside, Pa., assignor to The Electric Storage Battery Company, a corporation of New Jersey Filed Feb. 19, 1957, Ser. No. 641,050

9 Claims. (Cl. 136—6)

This invention relates to storage batteries, more particularly to methods of and means for producing and operating the batteries in containers sealed to prevent ingress and egress of gases and vapors.

Those skilled in the art have for some time recognized the desirability of a storage battery in an airtight container which not only prevents change in electrolyte by evaporation, but which also prevents egress of vapor and of gases evolved during the operation of the battery. Oxygen and hydrogen are the gases normally evolved and in some applications give rise to hazards because of the violent and explosive reaction of hydrogen when ignited and of the promotion of combustion by oxygen. In respect to the desirability of sealing against ingress of gases, it is to be remembered that in an alkaline type of battery carbon dioxide from the air combines with the electrolyte to form potassium carbonate which is deleterious to the operation of the battery and necessitates replacement of the electrolyte when the contamination exceeds a certain value. When vapors from a storage cell are corrosive, their avoidance is prerequisite to some battery uses.

In carrying out the present invention in one form thereof, storage batteries may be sealed at the factory and remain sealed during their normal life and without the development therein of gas pressure of excessive magnitude. In order to accomplish this objective, gases formed within the cell during normal use thereof are electrochemically removed at a rate such that the build-up of gas pressure is maintained within safe limits.

In order to accomplish these objectives, at the time of the sealing of the storage battery the positive electrode has chargeable material in amount less than the chargeable material of the negative electrode. This means that the positive electrode will always first attain a fully charged condition. Thus, there will always be preferential evolution of oxygen at the positive electrode and particularly in the event of over-charge. The oxygen evolved is electrochemically removed at an adequately high rate by providing a porous element having an extended surface in contact with the electrolyte and also having an extended surface exposed to a gas space above the electrolyte. The porous element provides therewithin a gas-liquid-solid interface of large area. The porous element has a low-resistance electrical connection to the negative electrode for the supply of electrons to said interface for reduction of oxygen diffused through the porous element to the interface. The supply of electrons by the negative electrode minimizes conversion of the chargeable material of the negative electrode after attainment by the positive electrode of its fully charged condition.

The porous element of the present invention is characterized by its unexpected efficiency in the reduction of the oxygen. That element comprises porous graphite which after removal of impurities has metallic silver dispersed therethrough. A non-wettable agent, such as a suspensoid of a fluorocarbon resin, preferably polytetrafluoroethylene, available on the market under the trademark "Teflon" is applied to the porous element after which the body as a whole is heated to a high temperature but below the melting point of the silver. The result is a gas-permeable but liquid-impermeable surface for the porous element. The surface of the element so treated with Teflon is not wettable by the electrolyte, and hence has a liquid-impermeable surface but one which retains its gas-permeability—due to its porosity—for flow or diffusion of gases to an interface therein. The non-wetting or non-wettable agent for alkaline cells may be selected from the group consisting of the silicones, latex, gum rubber and the hydrophobic resins, all of which are inert to the alkaline electrolyte.

For safe operation of the sealed cells, means must be provided to prevent a dangerous build-up of pressure during occasional over-discharge or reversal of the cells. The quantities of chargeable and the charged materials in the positive and in the negative electrodes must be adjusted in a way to assure, upon over-discharge of the battery, that oxygen will be preferably evolved at the negative electrode, then acting as a positive electrode. This oxygen is subsequently removed at the positive electrode, then acting as a negative electrode.

The present application is a continuation-in-part of Serial No. 574,320, filed March 27, 1956, and abandoned in favor of the present application.

Figure 2:
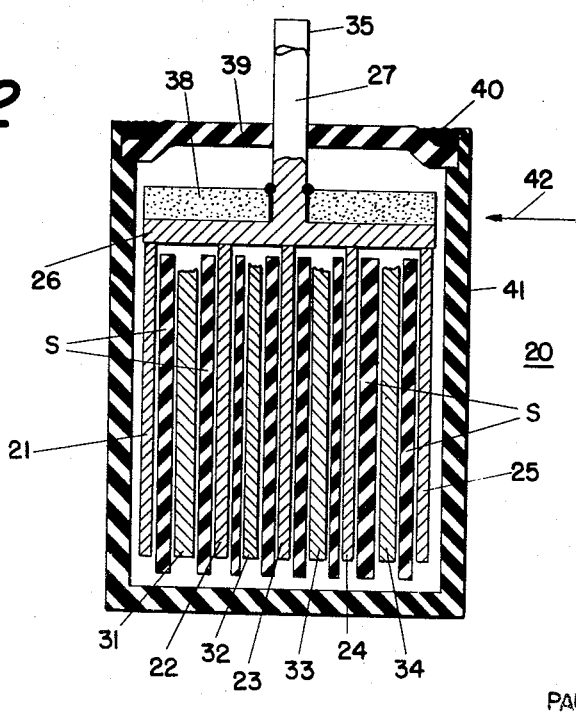
Figure 3:
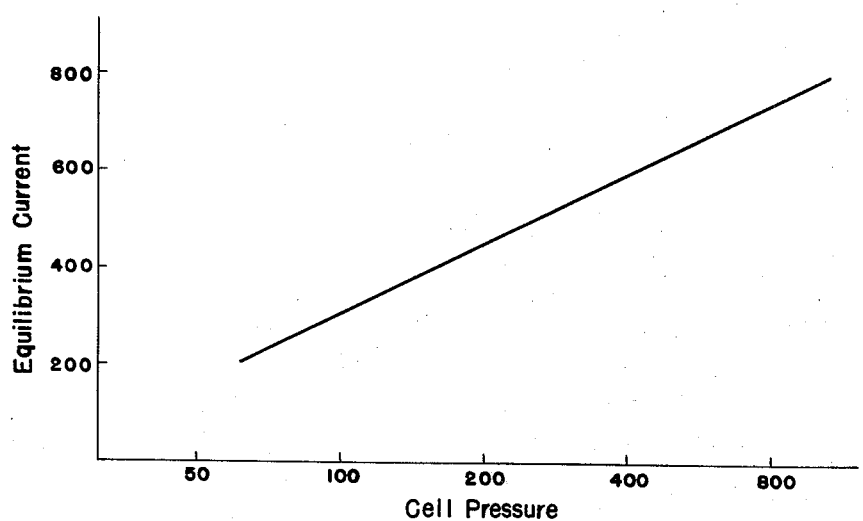
Figure 4:
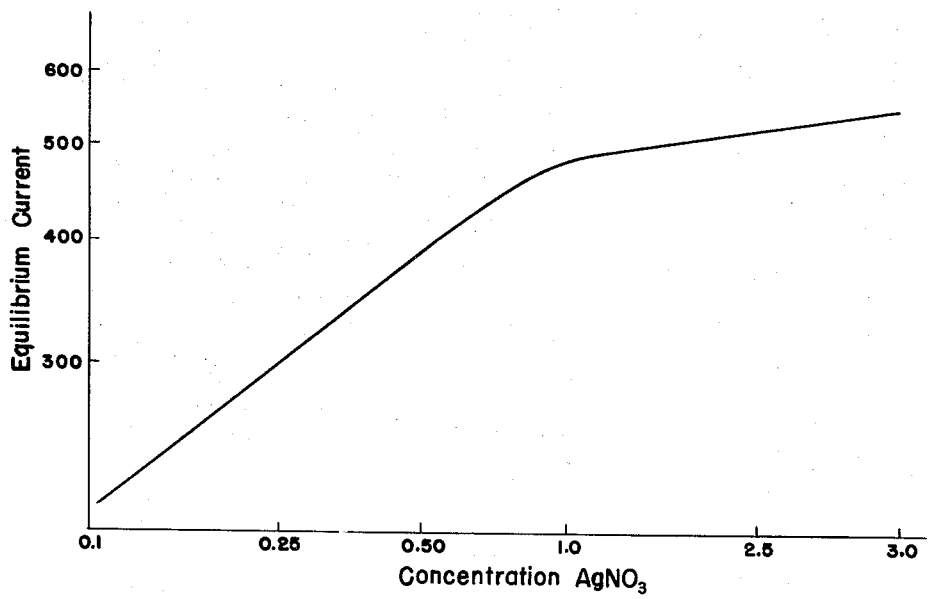

For a more detailed development of the underlying theory upon which the present invention is based, for further objects and advantages thereof, and for the manner in which the invention may be applied to sealed storage batteries of the lead-acid and of the alkaline type in which the plates are wetted by electrolyte, reference is to be had to the following description taken in conjunction with the accompanying drawings, in which:

Fig. 1 is a diagram explanatory of the invention;
Fig. 2 is a sectional view of a storage battery embodying the invention with certain parts thereof omitted for the purposes of clarity of illustration; and
Figs. 3 and 4 are explanatory graphs.

The present invention is particularly applicable to storage batteries of the type in which oxygen and hydrogen are evolved during operation thereof. While the invention is also applicable to storage batteries of the alkaline type, its application to storage batteries of the lead-acid type will first be presented.

In charging a partially discharged lead-acid battery, there is little, if any, gas evolution as long as the charging rate is within the normally used limits. However, as the chargeable material, lead sulphate, is used up on either the positive or the negative plates, gas evolution will begin. At the positive electrode there will be evolution of oxygen and at the negative electrode there will be evolution of hydrogen. In accordance with the present invention, there is substantially entirely prevented or avoided the evolution of hydrogen, and this is accomplished in the following manner.

At the time of the sealing of the storage battery cell, there is provided an excess of uncharged chargeable material at the negative electrode as compared with the amount of uncharged chargeable material at the positive electrode for the purpose of assuring that the positive electrode will always be fully charged prior to the attainment by the negative electrode of a fully charged condition; and, conversely, the negative electrode will be fully reversed sooner than the positive electrode.

The foregoing has been graphically illustrated in Fig. 1. First, it will be assumed that the positive electrode has been partially charged. The extent of charge is represented at 10 and may be taken as a measure of the percentage of lead sulphate ($PbSO_4$) which has been converted to lead dioxide ($PbO_2$). Thus, the broken line 11 represents the condition of the positive plate when fully discharged. All of the uncharged chargeable material is then lead sulphate (PbSO$_4$).

In the assumed example, the cell is sealed with the positive plate partially charged, the remaining uncharged positive chargeable material and the uncharged negative chargeable material being lead sulphate. The sealed cell may then be charged at the recommended rate, the basis of which will be hereinafter set forth. As the charging progresses, lead sulphate present in the positive electrode is gradually converted to lead dioxide. The end result of charging occurs as indicated at 12. Lead sulphate present in the negative electrode is converted to lead during charging. However, when the positive electrode is fully charged, as at 12, and the lead sulphate all converted to lead dioxide, the negative plate will not be fully charged since, as will be apparent from Fig. 1, further charging of the negative plate would be necessary to convert all of the lead sulphate to lead. The additional charging required is indicated by the bracket 14.

The factors thus far explained are important in the operation of the sealed cell. As the positive plate reaches its fully charged condition at 12, evolution of oxygen occurs. It may occur somewhat sooner than attainment of a full charge, depending on the rate of charging and perhaps other factors. As will be later explained, as soon as oxygen is evolved, it is electrochemically consumed and thereby removed by means hereinafter set forth which results in an equivalent discharge of the negative electrode. Thus, during over-charge oxygen is not only continuously removed, but the negative electrode is discharged at a rate such that the continued charging of the cell will not increase the conversion of lead sulphate to lead at the negative electrode. Thus, during all subsequent operation of the cell and after repeated charging and discharging thereof, there is retained in the cell a differential between the chargeable material of the positive electrode (PbSO$_4$) and the chargeable material of the negative electrode (PbSO$_4$) to insure the preferential evolution of oxygen during charging.

During charging and over-charging of the cell or battery, the lead sulphate of the positive electrode is always exhausted or converted to lead dioxide prior to the time all of the lead sulphate of the negative electrode is converted to lead. It is for the foregoing reasons that oxygen is preferentially evolved at the positive electrode, since the condition for evolution of hydrogen at the negative electrode is never attained after the initial sealing of the cell in accordance with the requirements above set forth.

If the foregoing differential were not provided, hydrogen gas would be evolved at the negative electrode upon overcharge thereof and would cause an undue rise in the gas pressure within the cell.

Before considering Fig. 1 in explanation of the conditions established during discharge and over-discharge, reference will be had to Fig. 2 where a cell 20 comprises a negative electrode having a plurality of plates 21–25 connected together by a strap 26 of conventional design from which there extends outwardly of the cell the post 27. Interposed between the negative plates 21–25 are positive plates 31–34 interconnected by a strap, not shown, from which there extends a post 35, a portion of the negative post 27 being cut away in Fig. 2 to show the post 35. For clarity there have been omitted from Fig. 2 the lugs from the positive plates, these both being of conventional construction and well understood by those skilled in the art. The separators S are shown.

In accordance with the present invention, it is not only important to provide the differential of chargeable material as between the positive electrode and the negative electrode to assure the prior attainment of the fully charged condition of the positive electrode ahead of the negative electrode, but it is also important to provide for the electrochemical conversion of the oxygen at a rate which prevents build-up of gas pressure within the cell with charging currents of substantial magnitude. It is a feature of the present invention that there is not only established a relatively high efficiency of conversion of the evolved oxygen, but also the negative electrode is to some degree discharged by the electrochemical conversion of the oxygen since it is the negative electrode which supplies the electrons or the exchange currents necessary for the removal of the oxygen. Thus the discharge of the negative electrode during overcharge prevents rise in the conversion of the chargeable material to the charged state and assures, during the life of the battery, continuance of the differential between the charged and chargeable materials of the positive and negative electrodes.

More particularly, there is disposed within the cell a porous element 38 electrically connected to the negative electrode as by pressing the element 38 upon the negative post 27 to assure a sliding, wiping action and a low-resistance electrical connection between them. If desired, the opening through the element 38 through which the post 27 extends may be lead-plated and burned or welded to the lead post 27. The electrical connection can be extended along the lead strap 26. The element 38 is of porous material for diffusion of oxygen therethrough to facilitate an electrochemical reaction for its removal from the interior of the cell 20 which is hermetically sealed. It may be sealed by a sealing compound for the cover 39 as shown at 40. The walls 41 and the cover 39 of the cell 20 may be of conventional construction and materials and need not be of increased strength from the standpoint of gas pressures likely to be encountered.

Preferably, the porous gas-diffusing element 38 will be of graphite activated by inclusion therein of a catalytic agent of the type which promotes the removal of oxygen. I have found that if the following procedure be utilized, oxygen can be reduced, i.e., removed, by the resultant activated graphite at a rate which permits charging currents of relatively large magnitude, which currents, if continued after a cell or storage battery attains full charge, will not produce a continued rise of gas pressure within the sealed cells. A porous graphite block is drilled and grooved for the purposes already explained in connection with Fig. 2. The block is then heated at least to a bright red heat. The heating of the graphite to temperatures above about 700° C. for an hour or more appears to be a necessary step and is effective at least to remove the impurities within the graphite. After cooling in air, the block is dipped for about one-half minute in an impregnating solution of silver nitrate, AgNO$_3$, to which there may be preferably added a drop of a non-ionic wetting agent, such as available on the market under the trademark "Triton X–100." The aqueous solution of silver nitrate may have a concentration in the range of from 0.5 to 2.5 grams per 100 cc. (cubic centimeters) of distilled water.

After the impregnation of the graphite block, it is heated, for example in an oven or over a Bunsen flame, until a faint red glow appears, i.e., to about 500° C. for a few minutes. This heating decomposes the silver nitrate leaving metallic silver dispersed throughout the graphite. The activated graphite block is now immersed in a dilute aqueous emulsion of a polytetrafluoroethylene, such as "Teflon" followed by baking in an oven for a substantial length of time. An hour at 200° C. to 300° C. has been found satisfactory. The aqueous emulsion of Teflon is prepared by adding from 0.5 cc. to 10.0 cc. of a 60% Teflon emulsion of 100 cc. of distilled water. The graphite block is then applied to the negative electrode as described above. It may be preferred first to apply the graphite block to the negative electrode and before the Teflon treatment. This I have done, and it will be noted, Fig. 2, that the graphite block has been secured to the negative electrode by burning or welding to the lead post 27. The subsequent baking of the Teflon-impregnated activated block takes place at a temperature somewhat below the melting point of the lead and thus does not adversely affect the negative electrode.

At the time of sealing the cell of the type shown in Fig. 2, the electrolyte, conventional aqueous solutions of sulphuric acid, is included in amount adequate to bring the level somewhat below the upper surface of the porous element 38 but insufficient at any time to cover the upper surface thereof as indicated by arrow 42. The upper surface of the porous element 38 above the level of the electrolyte will be adequate for the reason that oxygen more readily diffuses through the porous element from the atmosphere than directly from the electrolyte. As the oxygen diffuses through the porous element 38, with supply of electrons from the negative electrode to the gas-solid-liquid interface, the oxygen is converted to hydroxyl ions (OH−). The hydroxyl ions react with hydrogen ions of the electrolyte to form water. In this way the oxygen is removed from the cell.

In accordance with the present invention, it has been found that the porous element 38, activated as described above and electrically connected to the negative electrode for the supply of electrons thereto, effectively increases the rate of removal of the oxygen to prevent undue rise in pressure within the cell as a result of oxygen evolution.

It appears from my experimental work that the equilibrium current of a cell varies linearly with the logarithm of the oxygen pressure. This fact is illustrated in Fig. 3 where cell pressure has been plotted with abscissae on a log scale of the cell pressure and with ordinates for equilibrium current. By equilibrium current, I mean that current which, when used in charging the cell with the positive plate fully charged and the negative plate with some uncharged, unchargeable material, the cell pressure remains constant. For example, with a cell of given design there may be attained a pressure corresponding with 200 millimeters of mercury (absolute). The equilibrium current for such a cell may then be of the order of 420 milliamperes, which is to say that as long as the charging current for that cell does not exceed about 420 milliamperes, the cell pressure will not increase above 200 millimeters of mercury (absolute). Accordingly, it can be seen that the casing or housing for each cell will be designed to withstand the cell pressure for a given charging current which does not continue to rise during overcharge.

The relationship between the equilibrium current and cell pressure will be materially affected by the concentration of the silver nitrate used in impregnation of the graphite block. As shown in Fig. 4, as the concentration of the silver nitrate impregnating solution (plotted as abscissae) is increased, so will there be increased the equilibrium current, plotted as ordinates. The increase is substantially linear until the concentration of the impregnating solution of silver nitrate approaches one gram per 100 cc. of water. Thereafter the equilibrium current will be further increased but at a decreased rate. The optimum, from the cost standpoint, will be in the region from 0.75 to about 1.0 gram of silver nitrate per 100 cc. of water.

Returning now to Fig. 1, it will be recalled that at the level 12, all of the chargeable material of the positive electrode has been converted to lead dioxide. However, the negative electrode includes uncharged chargeable material which has not been converted to lead and in amount roughly indicated by the bracket 14. If now the cell is discharged from the level 12, it will be understood that the pure lead comprising the electrochemically active material of the negative plates 21–25 will be converted to lead sulphate and at the level indicated by the line 44, the conversion will be complete. At the level 44, however, there will remain a substantial amount of charged material, lead dioxide, at the positive electrode comprising plates 31–34. This material, capable of further discharge, plays a part in the operation resulting from over-discharge as will be explained in the theoretical discussion which will now be further developed.

The conditions prerequisite to safe operation of a sealed lead-acid cell, as illustrated schematically in Fig. 1, can also be expressed in mathematical form. There are always two conditions to be fulfilled, namely, an overcharge requirement and an over-discharge requirement. For overcharge, the condition is $$C_{+\ chargeable} < C_{-\ chargeable} \qquad (1)$$

where $C_{+\ chargeable}$ corresponds with the chargeable positive active material ($PbSO_4$) in the positive electrode expressed stoichiometrically in ampere hours capacity; and $C_{-\ chargeable}$ corresponds with the chargeable negative active material ($PbSO_4$) in the negative electrode expressed stoichiometrically in ampere hours' capacity.

For over-discharge of the lead-acid cell, the condition is $$2C_{+\ charged} + C_{+\ chargeable} > 2C_{-\ charged} + C_{-\ chargeable} \qquad (2)$$

where $C_{+\ charged}$ corresponds with the charged positive active material (amount of $PbO_2$ in the positive electrode expressed in ampere hours); and $C_{-\ charged}$ corresponds to the charged negative active material (amount of $Pb$ in the negative electrode expressed in ampere hours).

For successful construction of a sealed lead-acid cell, both Equations 1 and 2 are to be satisfied. A numerical example will further illustrate the applicability of the two conditions to storage battery design. A sealed cell with a capacity of 50 A.H. at full charge is to be constructed. At full charge, there is according to Fig. 1 and Equation or Condition 1 no chargeable material in the positive electrode but a measurable amount of chargeable material in the negative electrode. If we choose the safety limit such as to provide chargeable negative active material 14, Fig. 1, corresponding to 10 ampere hours at the state of full charge of the positive electrode, Equation 1 is fulfilled. Equation 2 then determines the minimum amount of positive charged active material which must be provided at full charge of the positive electrode ($C_{+\ chargeable}$ is then equal to zero), and $$2C_{+\ charged} > 2 \times 50 + 10 \qquad (3)$$

The positive electrode, therefore, must have in the state of full charge an amount of lead dioxide corresponding to more than 55 ampere hours. To provide a factor of safety, it will be desirable to provide a total amount of $PbO_2$ in the positive electrode at full charge corresponding to 65 ampere hours. Thus, the 50 ampere-hour battery will have a positive electrode with a 65 ampere-hour capacity at full charge while the negative electrode will have a 50 ampere-hour capacity of charged active material at full charge and 10 ampere-hour capacity of uncharged chargeable material.

Returning now to Fig. 1, upon discharge, the charged material, lead, of the negative electrode, in amount represented by bracket 43 when converted to lead sulphate, is the limiting factor. The remaining charged material $PbO_2$ of the positive electrode represented by bracket 10 is capable of further discharge.

If the cell 20 of Fig. 2 be connected with other cells and/or storage batteries, over-discharge of cell 20 may occur. The lead dioxide of the positive plates 31–34 present in amount indicated by the bracket 10 will be converted to lead sulphate, as overcharge continues. After the lead dioxide has all been converted to lead sulphate at the point or level indicated by the broken line 11, continued over-discharge then converts the lead sulphate of the plates 31–34 of the positive electrode to lead. If such over-discharge occurs below line 45, Fig. 1 (and it can also occur by reversal of polarity of the charging current), there will be conversion at the plates 21–25 of the negative electrode of lead sulphate to lead dioxide.

Continued over-discharge of the cell 20 results in a reversal of polarity and thus the negative electrode 21–25 will act as though it were a positive electrode, and the positive electrode 31–34 will act as a negative electrode. While under these circumstances, as soon as all of the lead sulphate of the negative electrode comprising the plates 21–25 has been converted to lead dioxide, as at level 45, there will be evolution of oxygen. This condition will rarely, if ever, be attained in operation of a lead-acid storage battery.

The important point here is that there has been provided an additional factor of safety against evolution of hydrogen, namely, by the capacity of the positive electrode as indicated by the region below the line 45. As for any oxygen which is evolved during conditions of over-discharge below the line 45 and prior to the evolution of hydrogen, the pressure within the cell will rise but not to a value which the container cannot be designed to withstand. As soon as charging begins, the oxygen evolved during over-discharge will be electrochemically removed and in the manner described above. The reason evolution of oxygen on over-discharge is unlikely in the lead-acid battery arises from the fact that there must be over-discharge below the line 44 by an amount substantially corresponding with the ampere-hour rating of the battery, a condition of over-discharge which would not be met even in misuse of a battery short of deliberate connection with reversed polarity to a charging source.

It may be observed that the material selected for the porous element associated with the negative electrode does not contribute to increased local action. More particularly, the graphite, treated and impregnated as above described, has a relative high hydrogen overvoltage.

In accordance with the present invention, the charging rates need not be made low as compared with the rates used for unsealed cells. Moreover, it is not necessary to require close inspection during the charging of sealed cells embodying the present invention to safeguard against overcharge thereof. The exact charging rate applicable to cells embodying the present invention will depend upon the area and effectiveness of the porous element 38. Where the element is small in size, it will be preferred to maintain the charging rate on the low side of normal limits in contrast with charging rates characterizing the "quick charge" method. By reason of the provisions already discussed, the discharge rate may be as required by the end use to which the battery is put. The discharge rate is not limited by prospective gas evolution.

Now that the principles of the invention have been discussed in terms of the lead-acid battery, it will be understood that they are also applicable to other types of batteries in which gases are evolved during charge, overcharge, discharge and over-discharge thereof. For example, in an alkaline battery, such as one of the nickel-cadmium type, the principles discussed in connection with Fig. 1 are applicable.

In such a cell, at the time of sealing, a part of the material of the positive plate will be nickelic hydroxide and the chargeable material $(Ni(OH)_2)$, expressed in ampere hours, less than the chargeable material of the negative electrode, $(Cd(OH)_2)$ expressed in ampere hours. When such a sealed cell is then placed on charge, it will be seen that all of the chargeable material of the positive electrode will be converted to nickelic hydroxide prior to the time all of the chargeable material of the negative electrode will be converted to cadmium. There will be preferential evolution of oxygen at the positive electrode, as in the case of the lead-acid battery. There will be lacking evolution of hydrogen by reason of the attainment of full charge of the positive electrode ahead of attainment of full charge of the negative electrode.

In respect to the alkaline cell, oxygen evolution occurs at or after the discharge to the level 44 of Fig. 1, which level corresponds with the return of all of the active material of the negative electrode to cadmium hydroxide, a condition of complete discharge of the negative electrode. This is in contrast with the lead-acid cell. Upon conversion of cadmium to cadmium hydroxide, no further oxidation thereof can take place and, accordingly, oxygen must be and is evolved.

For alkaline type sealed cells, the two conditions required for safe operation of the cell can be expressed mathematically. As in the case of sealed lead-acid cells, the overcharge condition is:

$$C_{+\ chargeable} < C_{-\ chargeable} \qquad (4)$$

that is, the amount of chargeable positive active material $(Ni(OH)_2$ in the positive plate expressed in ampere hours) must be less than the amount of chargeable negative active material $(Cd(OH)_2$ in the negative plate expressed in ampere hours).

The condition to be met for over-discharge of alkaline type sealed cells is:

$$C_{+\ charged} < C_{-\ charged} \qquad (5)$$

that is, the amount of charged positive active material $(Ni(OH)_3$ in the positive plates (expressed in ampere hours) must be larger than the amount of charged negative active material (Cd) in the negative plates (expressed in ampere hours).

A numerical example will now be used to illustrate the conditions for alkaline type cells. In order to build a cell with 50 ampere hours' capacity, the amount of charged negative active material (Cd) must be chosen to provide 50 ampere hours at the state of full charge of the positive plates plus an uncritical amount of chargeable negative active material $(Cd(OH)_2)$. Thus, to meet Equation 4, the chargeable negative active material can be equal to 10 ampere hours. According to Equation 5, the charged positive active material $(Ni(OH)_3)$ at the state of full charge of the positive electrode must be provided in an amount somewhat greater than 50 ampere hours. It may correspond with 55 ampere hours.

To achieve the excess of charged active material of the positive electrode, pursuant to Equation 5, the positive electrode will preferably have an initial charge at the time of sealing, i.e., there will be present at the positive electrode nickelic hydroxide in amount capable of delivering about 5 ampere hours of electricity.

Thus, alkaline cells satisfying Equations 4 and 5 may be designed as follows:

| Rated Capacity | At Full Charge | | | |
|---|---|---|---|---|
| | C+ chargeable | C+ charged | C− chargeable | C− charged |
| 50 | 0 | 55 | 10 | 50 |
| 35 | 0 | 40 | 5 | 35 |

In the alkaline battery, the porous element electrically connected to the negative electrode may be of construction set forth above as satisfactory for the lead-acid battery.

In each application to the sealed cell, the porous element is of extended surface area in its contact with the electrolyte for the reason that the reduction or removal of the gas takes place to large extent in the region of the gas-liquid-solid interface. It is of considerable importance that the electrolyte shall not penetrate deeply into the porous element, but shall make good liquid contact with at least one face thereof.

While in Fig. 2 the porous element 38 has been illustrated in the air space at the upper portion of the cell and with the corresponding porous element associated with the positive electrode just behind it, it is to be understood that the porous element may be provided in a variety of shapes, and such that there is lacking any positional limitation in the position of the sealed cell. For example, by extending the porous element around the inside surface of the vertical walls of the container as well as extending throughout the air space, as illustrated in Fig. 2, the cell may be positioned on its bottom, as illustrated in Fig. 2, or upon any one of its remaining five sides. In any such position, the dimensioning of the cell will be such as to bring the electrolyte to a point below the upper surface of the porous element. The upper surface thereof is always to be in a gas space to provide an extended interfacial area for removal of oxygen. The porous element 38 need not be flat on either the upper or lower surfaces, but may include an irregular surface with protrusions and the like further to extend the surface area both at the interfacial region and also within the electrolyte and within the air space for increased adsorption therein of the gases to be reduced.

Now that the principles of the invention as applied to two different types of storage batteries have been explained, it will be understood that still further variations may be made within the scope of the appended claims. In this connection, it will be remembered that the illustration first used in connection with Fig. 1 included the assumption that the positive electrode had been partially charged. Instead of utilizing the partially charged positive electrodes, the electrodes may in other ways be properly prepared prior to the sealing of the battery 20. The important requirement is that the positive electrode shall attain a state of full charge as at the line 12 with uncharged capacity remaining in the negative electrode as indicated by the bracket 14 of Fig. 1. Such an end result will be achieved by providing less chargeable or electrochemically active material for the positive electrode than the chargeable material of the negative electrode. In such event, when the battery is placed on charge, all of the chargeable material of the positive electrode will be converted prior to the time that all of the chargeable material of the negative electrode is converted to the charged state.

Another way of preparing the electrodes prior to sealing and initially with equal amounts of chargeable material for them, involves pretreatment of the negative electrodes. For example, if the negative electrodes have a part of the lead sulphate converted to lead dioxide, as indicated in the region between lines 11 and 44 of Fig. 1, then after sealing and upon charging, the lead dioxide of the negative plates will be converted to lead sulphate in the region of line 44 and thus the first conversion of the chargeable material to metallic lead at the negative electrode will be in the region above the line 44. In consequence, the positive electrode will attain full charge at the line 12 prior to attainment of full charge in respect to the chargeable capacity of the negative electrode. Thus, the invention may be practiced by partially charging the negative electrode as a positive before sealing or providing the foregoing differential of chargeable material as between the two electrodes before sealing.

It is emphasized that if the storage battery cell is sealed at the factory, it continues as a sealed battery until the end of its useful life and does not require opening or venting thereof during subsequent charging and discharging.

In the claims I have referred to chargeable material of one electrode with reference to the chargeable material of the other electrode as terms definitive, for example in Fig. 1, of the conversion of lead sulphate to lead dioxide and of lead sulphate to lead. Such terms are likewise applicable to and are intended to cover the chargeable material of the alkaline cell in which the chargeable material for the positive electrode is in its lower state of oxidation (nickelous hydroxide) and which is converted to its highest state of oxidation (nickelic hydroxide) during charging and the chargeable material of the negative electrode is in its highest state of oxidation (cadmium hydroxide) which during charging is converted to its lowest state of oxidation (metallic cadmium). The term electrode is used in a generic sense to cover either one or a plurality of plates forming the electrode of a cell.

What is claimed is:

1. A storage battery cell comprising electrolyte, positive and negative electrodes, insulating material separating them, a sealed container within which said electrodes, said insulating material and said electrolyte are disposed, said cell being characterized by the presence therein of a porous element comprising porous graphite having at least over the surface thereof a non-wetting agent inert to the electrolyte and selected from the group consisting of the silicones, latex, gum rubber and the hydrophobic resins, said element having a low resistance electrical connection to said negative electrodes, disposed in spaced relation with said positive electrodes and positioned within said sealed container for liquid contact with the electrolyte to form a gas-liquid-solid interface of extended area, said porous element having metallic silver dispersed therethrough for reduction of oxygen diffused through the porous element to said interface.

2. The sealed storage battery cell of claim 1 in which the chargeable material of said positive electrode and said negative electrode is lead sulphate, in which said electrolyte is an aqueous solution of sulphuric acid, and in which said non-wetting agent consists of a hydrophobic resin.

3. The sealed storage battery cell of claim 1 in which said electrodes and said electrolyte form a storage battery of the alkaline type.

4. The sealed storage battery cell of claim 1 in which said non-wetting agent for said porous element is polytetrafluoroethylene.

5. A storage battery cell comprising electrolyte, positive and negative electrodes, insulating material separating them, a sealed container within which said electrodes, said insulating material and said electrolyte are disposed, said cell being characterized by the presence of a porous element having a low-resistance electrical connection to said negative electrode, said element comprising porous graphite having at least over the surface thereof a non-wetting agent selected from the group consisting of the silicones, latex, gum rubber and hydrophobic resins, said element being disposed in spaced relation with said positive electrode and positioned within said sealed container for liquid contact with the electrolyte to form a gas-liquid-solid interface of extended area, said porous element having metallic silver dispersed therethrough as a catalytic agent for reduction of oxygen diffused through the porous element to said interface, said cell being further characterized during operation between discharged and charged conditions by the presence of uncharged chargeable material of the negative electrode in amount greater than the uncharged chargeable material of the positive electrode, the relative amount of said charged and said uncharged chargeable material being in terms of their ampere-hour capacities.

6. An alkaline storage battery cell comprising a sealed container, positive and negative electrodes, insulating material separating them and electrolyte within said sealed container, said cell being characterized by the presence of a porous element of graphite having a low-resistance electrical connection to said negative electrode, in spaced relation with said positive electrode and positioned within said sealed container for liquid contact with the electrolyte to form a gas-liquid-solid interface of extended area, said porous element having metallic silver dispersed therethrough as a catalytic agent for reduction of oxygen diffused through the porous element into the region of said interface, said porous element having an extended surface region including a non-wetting agent selected from the group consisting of the silicones, latex, gum rubber and the hydrophobic resins, said cell being characterized by the presence in terms of ampere-hour capacities of charged active material and uncharged chargeable active material as between the positive and negative electrodes in quantities respectively establishing conditions of operation such that the amount of electricity required to convert the sum of the charged and uncharged positive active material into its lowest oxidized state where hydrogen evolution begins exceeds the amount of electricity required to convert the sum of the charged and uncharged negative active material into its highest oxidized state where oxygen evolution begins, said cell being further characterized by the presence of uncharged chargeable material of the negative electrode at all times exceeding the uncharged chargeable material of the positive electrode.

7. A lead-acid storage battery cell comprising positive and negative electrodes, insulating material separating them, a sealed container within which said electrodes and said insulating material are disposed and electrolyte within said sealed container in amount fully to cover said electrodes, said cell being characterized by the presence of a porous element of graphite having a low-resistance electrical connection to said negative electrode, in spaced relation with said positive electrode and positioned within said sealed container for liquid contact with the electrolyte to form a gas-liquid-solid interface of extended area, said porous element having metallic silver dispersed through the region of the interface as a catalytic agent for reduction of oxygen diffused through the porous element to said interface, said porous element having a surface region which includes polytetrafluoroethylene to render that region non-wettable by said electrolyte, said cell being further characterized during operation by the presence in terms of ampere-hour capacities of charged material of the negative electrode materially exceeding the charged material of the positive electrode and by the proportioning of the active materials such that the sum of twice the ampere-hour capacity of the charged active material of the positive electrode plus the ampere-hour capacity of the uncharged chargeable material of the positive electrode exceeds the sum of twice the ampere-hour capacity of the charged active material of the negative electrode plus the ampere-hour capacity of the uncharged chargeable material of the negative electrode, said cell being further characterized by the presence of uncharged chargeable material of the negative electrode at all times exceeding the uncharged chargeable material of the positive electrode.

8. Structure for preventing excessive rise of gas pressures in the operation of a sealed cell including therein electrodes and an electrolyte, comprising porous graphite having metallic silver dispersed throughout at least an extended region adjacent a surface thereof and polytetrafluoroethylene in quantity rendering said region adjacent said surface non-wettable by electrolyte to form when immersed in the electrolyte of the cell a solid-gas-liquid interface, and an electrical conductor connected to said porous graphite by means of which electrons may be supplied to said porous graphite to consume in an electrochemical reaction gas diffused through said porous graphite to said interface.

9. Structure for preventing excessive rise of gas pressure due to evolution of oxygen in the operation of a sealed cell including therein electrodes and an electrolyte, comprising porous graphite having metallic silver dispersed therethrough and polytetrafluoroethylene in quantity rendering the surface region of said graphite non-wettable by electrolyte to form when immersed in the electrolyte of the cell a solid-gas-liquid interface of extended area, and an electrical conductor connected to said porous graphite by means of which electrons may be supplied to said porous graphite to consume in an electrochemical reaction oxygen diffused through said porous graphite to the region of said interface.

References Cited in the file of this patent

UNITED STATES PATENTS

| | | |
|---|---|---|
| 2,104,973 | Dassler | Jan. 11, 1938 |
| 2,131,592 | Lange et al. | Sept. 27, 1938 |
| 2,275,281 | Berl | Mar. 3, 1942 |
| 2,571,927 | Neumann et al. | Oct. 16, 1951 |
| 2,636,058 | Neumann | Apr. 21, 1953 |
| 2,646,455 | Jeannin | July 21, 1953 |
| 2,651,669 | Neumann | Sept. 8, 1953 |

FOREIGN PATENTS

| | | |
|---|---|---|
| 677,770 | Great Britain | Aug. 20, 1952 |
| 741,255 | Great Britain | Nov. 30, 1955 |
| 741,345 | Great Britain | Nov. 30, 1955 |